US012761517B2

(12) United States Patent
Zhao et al.

(10) Patent No.: US 12,761,517 B2
(45) Date of Patent: Oct. 13, 2026

(54) MULTICOLOR ELECTROCHROMIC STRUCTURE, FABRICATION METHOD AND APPLICATION THEREOF

(71) Applicant: SUZHOU INSTITUTE OF NANO-TECH AND NANO-BIONICS (SINANO), CHINESE ACADEMY OF SCIENCES, Suzhou (CN)

(72) Inventors: Zhigang Zhao, Suzhou (CN); Zhen Wang, Suzhou (CN); Shan Cong, Suzhou (CN)

(73) Assignee: SUZHOU INSTITUTE OF NANO-TECH AND NANO-BIONICS (SINANO), CHINESE ACADEMY OF SCIENCES, Suzhou (CN)

( * ) Notice: Subject to any disclaimer, the term of this patent is extended or adjusted under 35 U.S.C. 154(b) by 375 days.

(21) Appl. No.: 18/354,686

(22) Filed: Jul. 19, 2023

(65) Prior Publication Data

US 2023/0367167 A1 Nov. 16, 2023

Related U.S. Application Data

(63) Continuation-in-part of application No. 16/762,671, filed as application No. PCT/CN2019/077096 on Mar. 6, 2019, now Pat. No. 11,747,695.

(30) Foreign Application Priority Data

Feb. 27, 2019 (CN) ......................... 201910146293.7

(51) Int. Cl.
*G02F 1/153* (2006.01)
*G02F 1/1523* (2019.01)
*G02F 1/157* (2006.01)

(52) U.S. Cl.
CPC ............ *G02F 1/157* (2013.01); *G02F 1/1523* (2013.01)

(58) Field of Classification Search
CPC .. G02F 1/157; G02F 1/1523; G02F 1/133354; G02F 1/1524; G02F 1/155; G02F 1/1533; G02F 2203/34
(Continued)

(56) References Cited

U.S. PATENT DOCUMENTS 5,896,005 A * 4/1999 Gurvitch .................. G02F 1/21 359/263
2010/0079844 A1* 4/2010 Kurman .................... E06B 9/24 359/266
(Continued)

FOREIGN PATENT DOCUMENTS

EP 0818706 A2 * 1/1998 .............. G02F 1/21

*Primary Examiner* — Mahidere S Sahle
(74) *Attorney, Agent, or Firm* — Bayramoglu Law Offices LLC

(57) ABSTRACT

A multicolor electrochromic structure comprises a working electrode, an electrolyte and an auxiliary electrode. The electrolyte is distributed between the working electrode and the auxiliary electrode. The working electrode comprises an electrochromic layer which comprises a first reflective surface and a second reflective surface arranged face to face in parallel. A dielectric layer is arranged between the first and the second reflective surface. The first and the second reflective surfaces and the dielectric layer form an optical cavity. The dielectric layer is fabricated by an electrochromic material. The multicolor electrochromic structure can combine a structural color with electrochromism to display various color changes; it features a simple structure, low costs and a wide application prospect, and it is easy to be fabricated. Also provided are a fabrication method and a regulation method of the multicolor electrochromic struc-
(Continued)

ture, and an electrochromic device, an image display, comprising the multicolor electrochromic structure.

20 Claims, 5 Drawing Sheets

(58) Field of Classification Search
USPC .................................................. 359/267, 273
See application file for complete search history.

(56) References Cited

U.S. PATENT DOCUMENTS

| | | | | |
|---|---|---|---|---|
| 2013/0128333 | A1* | 5/2013 | Agrawal | B60R 1/12 359/267 |
| 2019/0094642 | A1* | 3/2019 | Saenger Nayver | G02F 1/157 |

* cited by examiner

MULTICOLOR ELECTROCHROMIC STRUCTURE, FABRICATION METHOD AND APPLICATION THEREOF

CROSS-REFERENCE TO RELATED APPLICATIONS

The present application is a continuation-in-part application of U.S. patent application Ser. No. 16/762,671 entitled "MULTICOLOR ELECTROCHROMIC STRUCTURE, FABRICATION METHOD AND APPLICATION THEREOF" filed May 8, 2020 with the USPTO, which is the US national phase of PCT/CN2019/077096 entitled "POLYCHROME ELECTROCHROMIC STRUCTURE, PREPARATION METHOD THEREFOR AND APPLICATION THEREOF" filed Mar. 6, 2019 and claiming priority to Chinese patent application number 201910146293.7 entitled "MULTICOLOR ELECTROCHROMIC STRUCTURE, FABRICATION METHOD AND APPLICATION THEREOF" filed with the China National Intellectual Property Administration on Feb. 27, 2019. Accordingly, the present application claims priority of both the International application PCT/CN2019/077096 and the Chinese patent application number 201910146293.7; the content of both applications is incorporated herein by reference in their entirety.

TECHNICAL FIELD

The present invention relates to an electrochromic device, specifically to a multicolor electrochromic structure, a fabrication method and application thereof, and belongs to the field of photoelectric technologies.

BACKGROUND

Electrochromism is the phenomenon where the electronic structure and optical properties (such as reflectance, transmittance, absorption and the like) of an electrochromic material stably and reversibly change under the action of an external electric field or current, and shows reversible color and transmittance changes in appearance. An electrochromic device fabricated by an electrochromic material is widely applied to a smart window, a display, an imaging device and the like. The traditional electrochromic device can be classified a transmittance mode and a reflection mode. However, the color of the electrochromic device is only decided by its electronic structure and optical properties. Compared with an organic-molecule or organic-polymer electrochromic material, an inorganic electrochromic material shows excellent cycling stability, great thermal stability, chemical stability and longer service life, but its color regulation still is very monotonous. It can be specifically explained as follows: (1) the inorganic electrochromic material has a very monotonous electrochromic state, for example, most of the inorganic electrochromic materials can only be converted between a transparent state and a blue state; (2) the inorganic electrochromic material is lack of fine regulation of color, for example, blue as one of the three primary colors can be divided into sky blue, water blue, sea blue, peacock blue, navy blue and the like based on different hues. However, the traditional electrochromic material such as the tungsten oxide material can only change the degree of brightness of blue, but not the hue of the blue.

Therefore, multicolor regulation of the inorganic electrochromic material always is the bottleneck of expanding application of inorganic electrochromic displays and imaging devices.

SUMMARY

To overcome deficiencies of the prior art, a main objective of the present invention mainly is to provide a multicolor electrochromic structure, a fabrication method and application thereof.

To achieve the above objective, the present invention adopts the following technical solutions:

An embodiment of the present invention provides a multicolor electrochromic structure, which comprises a working electrode, an electrolyte and an counter electrode. The electrolyte is distributed between the working electrode and the counter electrode. The working electrode comprises an electrochromic layer. The electrochromic layer comprises a first reflective surface and a second reflective surface, which are arranged face to face in parallel. A dielectric layer is arranged between the first reflective surface and a second reflective surface. The first reflective surface, the second reflective surface and the dielectric layer form an optical cavity. When incident light falls in the optical cavity, a phase shift of a reflected light formed on the first reflective surface and a reflected light formed on the second reflective surface is $\tilde{\beta}=(2\pi/\lambda)\tilde{n}_1 d \cos \tilde{\theta}_1$. d is a thickness of the dielectric layer; $\tilde{n}_1$ is a refractive index of the dielectric layer; $\lambda$ is a wavelength of the incident light; $\tilde{\theta}_1$ is an angle of refraction when the incident light passes through the first reflective surface.

In some embodiments, the first reflective surface is a first surface of the dielectric layer, the second reflective surface is a combined interface of a second surface of the dielectric layer and a metal layer, and the first surface and the second surface are arranged back to back.

In some embodiments, the electrochromic layer comprises a metal reflective layer and at least one dielectric layer, and the dielectric layer is mainly fabricated by an electrochromic material, especially an inorganic electrochromic material.

In some preferred embodiments, the metal reflective layer is further a current collector of the electrochromic layer.

The embodiment of the present invention further provides a fabrication method of the multicolor electrochromic structure, which comprises:

- fabricating a metal reflective layer and a dielectric layer to form a working electrode; and
- assembling the working electrode, an electrolyte, an counter electrode to form a multicolor electrochromic structure.

The embodiment of the present invention further provides a regulation method of the multicolor electrochromic structure, which comprises:

- connecting the working electrode and the counter electrode with a power supply to form a working circuit;
- regulating the difference in potential between the working electrode and the counter electrode such that the refractive index of an electrochromic material in the dielectric layer is changed so as to regulate the color of the multicolor electrochromic structure.

The embodiment of the present invention further provides application of the multicolor electrochromic structure, such as fabricating an electrochromic device and an image display.

Compared with the prior art, the embodiment of the present invention can obtain various structural colors by regulating the material of the metal reflective layer, the material of the dielectric layer and/or the thickness of the dielectric layer in the electrochromic layer. Furthermore, voltage is applied to the electrochromic layer such that ions are implanted into or released from the electrochromic material, thereby causing changes of the refractive index of the electrochromic material and optical parameters of the dielectric layer, and finally causing color change of the electrochromic layer. The multicolor electrochromic structure has various color changes by combination of the structural color and the electrochromism, simple fabrication technique, low costs and wide application prospect in the field of photoelectric technologies, and is suitable for scale production and application.

DESCRIPTION OF THE EMBODIMENTS

Figure 1:
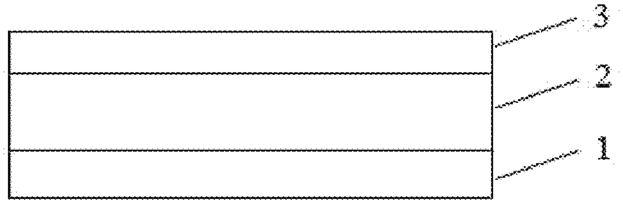
FIG. 1 is a schematic diagram of a multicolor electrochromic structure in a typical embodiment of the present invention.

In order to illustrate the embodiments of the present invention or the technical solutions in the prior art more clearly, the drawings required for use in the description of the embodiment or the prior art will be simply introduced below; obviously, the drawings described below are merely some of the embodiments recorded in the present invention, and for a person ordinarily skilled in the art, other drawings may be also obtained according to these drawings without involving any inventive effort.

It should be noted that the use of relational terms herein, such as first and second and the like, are used solely to distinguish one entity or action from another without necessarily requiring or implying any actual relationship or order between such entities or actions. Furthermore, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Where no other restrictions are stated, the elements defined by the phrase "comprising a" do not exclude the presence of additional identical elements in a process, method, article, or apparatus that includes said elements.

In one aspect, an embodiment of the present invention provides a multicolor electrochromic structure, which comprises a working electrode, an electrolyte and an counter electrode. The electrolyte is distributed between the working electrode and the counter electrode. The working electrode comprises an electrochromic layer. The electrochromic layer comprises a first reflective surface and a second reflective surface, which are arranged face to face in parallel. A dielectric layer is arranged between the first reflective surface and a second reflective surface. The first reflective surface, the second reflective surface and the dielectric layer form an optical cavity. When incident light falls in the optical cavity, a phase shift of a reflected light formed on the first reflective surface and a reflected light formed on the second reflective surface is $\tilde{\beta}=(2\pi/\lambda)\tilde{n}_1 d \cos \tilde{\theta}_1$. d is a thickness of the dielectric layer; $\tilde{n}_1$ is a refractive index of the dielectric layer; $\lambda$ is a wavelength of the incident light; $\tilde{\theta}_1$ is an angle of refraction when the incident light passes through the first reflective surface.

Further, the first reflective surface is a first surface of the dielectric layer, the second reflective surface is a combined interface of a second surface of the dielectric layer and a metal layer, and the first surface and the second surface are arranged back to back.

Further, when the multicolor electrochromic structure is working, the reflected light formed by the incident light on the first surface (namely the first reflective surface) of the dielectric layer and the reflected light formed by the incident light passing through the dielectric layer on a surface (namely the second reflective surface) of the metal layer are in interference superposition.

Further, if a refractive index of a medium on the first surface of the dielectric layer is defined as $\tilde{n}_0$, a reflection coefficient of the first reflective surface is $\tilde{r}_{01}=(\tilde{n}_0 \cos \tilde{\theta}_0-\tilde{n}_1 \cos \tilde{\theta}_1)/(\tilde{n}_0 \cos \tilde{\theta}_0+\tilde{n}_1 \cos \tilde{\theta}_1)$ wherein $\tilde{\theta}_0$ is an angle of incidence of the incident light.

Further, if a refractive index of a medium on the second surface of the dielectric layer is defined as $\tilde{n}_2$, a reflection coefficient of the second reflective surface is $\tilde{r}_{12}=(\tilde{n}_1 \cos \tilde{\theta}_1-\tilde{n}_2 \cos \tilde{\theta}_2)/(\tilde{n}_1 \cos \tilde{\theta}_1+\tilde{n}_2 \cos \tilde{\theta}_2)$, wherein $\tilde{\theta}_2$ is an angle of refraction when the incident light passes through the second reflective surface.

Further, a reflection coefficient of the electrochromic layer is $$\tilde{r} = \frac{\tilde{r}_{01} + \tilde{r}_{12}e^{2i\beta}}{1 + \tilde{r}_{01}\tilde{r}_{12}e^{2i\beta}},$$

and its reflectance is $$R = |\tilde{r}|^2 = \frac{\tilde{r}_{01}^2 + \tilde{r}_{12}^2 + 2\tilde{r}_{01}\tilde{r}_{12}\cos 2\beta}{1 + \tilde{r}_{01}^2\tilde{r}_{12}^2 + 2\tilde{r}_{01}\tilde{r}_{12}\cos 2\beta}.$$

Furthermore, $(R_{max}-R_{min})\geq10\%$, preferably above 20%, more preferably above 30%, further preferably above 40%. Wherein, $R_{max}$ is a maximum value of the reflectivity of the electrochromic layer on a visible light with a wavelength length of 430 nm-780 nm, and $R_{min}$ is a minimum value of the reflectivity of the electrochromic layer on the visible light with a wavelength length of 430 nm-780 nm.

Further, the electrochromic layer comprises a metal reflective layer and at least one dielectric layer, and the dielectric layer is mainly fabricated by an electrochromic material.

FIG. 1 shows a multicolor electrochromic structure in a typical embodiment of the present invention. The multicolor electrochromic structure comprises a working electrode 1, an counter electrode 3 and an electrolyte layer 2. The electrolyte layer 2 is arranged between the working electrode 1 and the counter electrode 3.

In this embodiment, the type of the electrolyte layer is not specially limited, and the electrolyte layer can be formed by using a liquid electrolyte, a gel polymer electrolyte or an inorganic solid electrolyte. In some embodiments, the electrolyte layer is in contact with a dielectric layer and provides ions that are used for discoloring or decoloring an electrochromic material, for example a material for a mobile environment of a hydrogen ion or a lithium ion.

The electrolyte layer can comprise one more compounds, for example compounds containing $H^+$, $Li^+$, $Al^+$, $Na^+$, $K^+$, $Rb^+$ or $Cs^+$. The electrolyte layer can comprise lithium salt compounds, for example $LiClO_4$, $LiBF_4$, $LiAsF_6$ or $LiPF_6$. The ions contained in the electrolyte layer can take effects on decoloration of the device or light transmittance change when being embedded into or removed from the dielectric layer.

In some cases, the electrolyte layer can adopt the liquid electrolyte, for example water-system LiCl, $AlCl_3$, HCl and $H_2SO_4$ aqueous solutions.

In some cases, the electrolyte layer can adopt a mixed electrolyte, for example a mixed electrolyte consisting of two or more than two of salts from water-system LiCl, $AlCl_3$, HCl, $MgCl_2$, $ZnCl_2$ and the like. When an electrolyte comprising two or more ions is used, the electrochromic structure in the foregoing embodiment of the present invention has richer color and higher color saturation compared with the electrolyte only comprising a single ion.

In some cases, the electrolyte layer can also comprise a carbonate compound based electrolyte. The compound based on carbonate has a high dielectric constant and therefore can increase ion conductivity provided by a lithium salt. As the compound of carbonate, at least one of the following can be used: PC (propylene carbonate), EC (ethyl carbonate), DMC (Dimethyl carbonate), DEC (diethyl carbonate) and EMC (ethyl methyl carbonate). For example, organic-system $LiClO_4$ or Na $(ClO_4)_3$ propylene carbonate electrolyte can be used.

In some cases, the electrolyte layer can be a gel electrolyte, for example PMMA-PEG-$LiClO_4$ and PVDF-PC-LiPF6, but is not limited thereto.

When an inorganic solid electrolyte is used as the electrolyte layer, the electrolyte layer can comprise LiPON or $Ta_2O_5$. For example, the electrolyte layer can be a metal oxide film containing Li, such as a LiTaO or LiPO film. In addition, the inorganic solid electrolyte can be an electrolyte in which components such as B, S and W are added in LiPON or $Ta_2O_5$, for example can be $LiBO_2$+$Li_2SO_4$, $LiAlF_4$, $LiNbO_3$, $Li_2O$—$B_2O_3$ or the like.

In some cases, the electrolyte layer adopts a full-solid electrolyte, which can be combined to present as a solid dielectric layer, a metal reflective layer, a counter electrode, etc. to form a full-solid multicolor electrochromic structure.

The full-solid electrolyte in the full-solid multicolor electrochromic structure can be present in a form of a solid ion conductive layer. The color changing principle of such the full-solid multicolor electrochromic structure is as follows: the metal reflective layer and other layers of materials constitute a metal-dielectric structure, and can also include other layers, such as an ion conductive layer, an ion storage layer and a transparent conductive layer. By adjusting the thickness of each layer of materials to a suitable range, an electrochromic device with a structural color can be prepared. Further, by applying a voltage, the refractive index of the electrochromic material can be adjusted, and the color of the full-solid multicolor electrochromic device can also be adjusted.

Wherein the electrolyte layer 2 may be a proper aqueous electrolyte, an organic electrolyte or a gel electrolyte, such as LiCl, $AlCl_3$, HCl, aqueous solution of $H_2SO_4$, a propylene carbonate electrolyte of $LiClO_4$, etc., but is not limited thereto.

Figure 2:
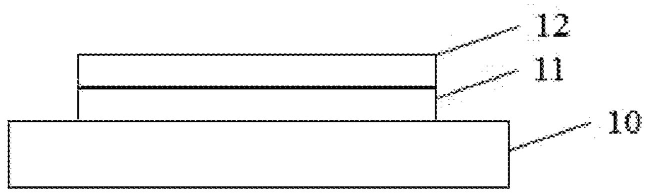
FIG. 2 is a schematic structural diagram of an electrochromic layer in FIG. 1.

As shown in FIG. 2, the working electrode 1 comprises an electrochromic layer. The electrochromic layer comprises a metal reflective layer 11 and a dielectric layer 12. The dielectric layer 12 is fabricated by an electrochromic material.

Wherein, as described above, the structural color of the electrochromic layer can be changed by regulating the material of the metal reflective layer, the material of the dielectric layer, the thickness of the dielectric layer and the like. Furthermore, the color of the dielectric layer can change by regulating the voltage, the current, etc. applied to an electrochromic material.

Wherein the electrochromic material may be an inorganic electrochromic material or an organic electrochromic material, preferably the inorganic electrochromic material.

The inorganic electrochromic material suitable for the embodiment of the present invention may comprise oxides of Co, Rh, Ir, Ni, Cr, Mn, Fe, Ti, V, Nb, Ta, Mo and W, for example $LiNiO_2$, $IrO_2$, NiO, $V_2O_5$, $LixCoO_2$, $Rh_2O_3$, $CrO_3$, $WO_3$, $MoO_3$, $Nb_2O_5$, $Ta_2O_5$ or $TiO_2$, etc., but is not limited thereto, such as Prussian blue etc. The organic electrochromic material suitable for the embodiment of the present invention may comprise an organic polymer, a small organic molecule, a metal supermolecule polymer, a metal organic compound, etc., such as methyl violet, viologen, polyaniline, polythiophene, polypyrrole, prussian blue, metal organic chelates (such as titanium cyanine compounds), polydiyne, etc., but is not limited thereto.

In some cases, a metal material layer, especially thin-layer metal, can also be added on the dielectric layer to optimize the color of the multicolor film. Specifically, for some materials or multicolor films with proper thicknesses, the addition of the metal material with a proper thickness can improve the intensity difference of a reflectivity curve and then improve the saturation of color. Wherein, the metal can be selected from any one of gold, silver, cobalt, copper, nickel, palladium, platinum, tin, titanium, tungsten and chromium, or their alloys, etc., but is not limited thereto. The thickness of the metal layer can be preferably 0-30 nm, especially preferably 1-10 nm.

In some cases, a semiconductor material can be also be added on the dielectric layer to optimize the color of the multicolor film. For some multicolor films with specific materials or thicknesses, the addition of a semiconductor material with a proper thickness can improve the intensity difference of the reflectivity curve and then improve the saturation of color. Wherein, the semiconductor can be selected form $Al_2O_3$, $SiO_2$, ZnS, $MgF_2$, silicon nitride, etc., but is not limited thereto. The thickness of the semiconductor can be preferably 0-300 nm, especially preferably 1-100 nm.

In some embodiments, the dielectric layer is in contact with the electrolyte.

In some embodiments, the thickness of the dielectric layer preferably is in the range of 50-2000 nm such that the color saturation of the multicolor electrochromic structure is higher.

In some embodiments, the thickness of the metal reflective layer may be any values, preferably more than 20 nm, more preferably in the range of 50-3000 nm.

In some embodiments, the metal reflective layer comprises one or more transition metals and/or post-transition metals such as any one of gold, silver, cobalt, copper, nickel, palladium, platinum, tin, titanium, tungsten and chromium, etc., but is not limited thereto.

In some preferred embodiments, the metal reflective layer is further utilized as a current collector of the electrochromic layer.

In some embodiments, the counter electrode comprises a transparent conducting electrode with an ion storage layer, and the material of the ion storage layer may be NiO, $Fe_2O_3$, $TiO_2$, etc., but is not limited thereto. The ion storage layer is in contact with the electrolyte.

In some cases, the transparent conductive electrode can be formed by a material comprising high light transmittance, low thin-layer resistance and other characteristics, for example can be formed by a material comprising any one selected from ITO (indium tin oxide), FTO (fluorine doped tin oxide), AZO (aluminum doped zinc oxide), GZO (gallium doped zinc oxide), ATO (antimony doped tin oxide), IZO (indium doped zinc oxide), NTO (niobium doped titanium oxide), ZnO, OMO (oxide/metal/oxide), and a CTO transparent conductive oxide; a silver (Ag) nanowire; a metal mesh; or OMO (oxide metal oxide).

The method for forming the transparent conductive electrode is not specially limited, and any known methods can be used without limitation. For example, a film electrode layer comprising transparent conductive oxide particles can be formed on a glass basic layer through methods such as sputtering or printing (screen printing, gravure printing, inkjet printing, etc.). In the case of a vacuum method, the thickness of the electrode layer prepared thereby can be in a range of 10 nm-500 nm, while in the case of a printing method, the thickness can be in a range of 0.1 μm-20 μm. In one example, the visible light transmittance of the transparent conductive electrode layer can be 70%-95%. In some embodiments, referring to FIG. 2, the working electrode may further comprise a substrate 10, and the electrochromic layer is arranged on the substrate.

The material of the substrate may be inorganic or organic, such as glass, organic glass, a plastic plate, a wood plate, metal, etc., but is not limited thereto.

In some embodiments, the electrolyte comprises a liquid electrolyte, a gel electrolyte or a solid electrolyte.

In some specific embodiments, the working voltage of the multicolor electrochromic structure is from −4 V to +4 V, but is not limited thereto.

In another aspect, an embodiment of the present invention provides a fabrication method of the multicolor electrochromic structure, which comprises:

- fabricating a metal reflective layer and a dielectric layer to form a working electrode; and
- assembling the working electrode, an electrolyte, an counter electrode to form a multicolor electrochromic structure.

In some embodiments, the metal reflective layer and the dielectric layer can be fabricated in at least one manner of magnetron sputtering, electron beam evaporation, thermal evaporation and electrochemical deposition.

More specifically, the dielectric layer can be fabricated in a manner of magnetron sputtering, electron beam evaporation, thermal evaporation, electrochemical deposition, etc.

More specifically, the metal reflective layer can be fabricated in a manner of magnetron sputtering, electron beam evaporation, thermal evaporation, etc.

In some embodiments, an electrolyte layer can be formed by encapsulating a liquid electrolyte or closely pressing a gel electrolyte, and is arranged between the working electrode and the counter electrode.

Further, the metal reflective layer and the dielectric layer can be sequentially formed on a substrate.

In another aspect, an embodiment of the present invention provides a regulation method of a multicolor electrochromic structure, which comprises:

- connecting a working electrode and an counter electrode with a power supply to form a working circuit;
- regulating the difference in potential between the working electrode and the counter electrode such that the refractive index of an electrochromic material in a dielectric layer is changed so as to regulate the color of the multicolor electrochromic structure. Such regulating process may be dynamic.

In some embodiments, the color of the multicolor electrochromic structure may also be regulated by regulating the material of a metal reflective layer and/or the thickness and/or the material of the dielectric layer.

In another aspect, an embodiment of the present invention provides an electrochromic device comprising the multicolor electrochromic structure. The electrochromic device may further comprise an additional encapsulation structure, a control module, a power supply module, which may be combined with the multicolor electrochromic structure in a common manner.

In another aspect, an embodiment of the present invention provides an image display device comprising the multicolor electrochromic structure or the electrochromic device, wherein the image display device may be a display screen, an imaging device, etc., but is not limited thereto.

In another aspect, an embodiment of the present invention provides an apparatus comprising the multicolor electrochromic structure, the electrochromic device or the image display device, wherein the apparatus may be a door, a window, or an external wall of a house, a vehicle, etc., and may also be an outdoor billboard, etc., but is not limited thereto.

The multicolor electrochromic structure provided by the embodiment of the present invention can overcome a disadvantage that the color of the traditional inorganic electrochromic device is monotonous, combines various structural colors with the electrochromism to enrich colors of the electrochromic device and also achieves dynamic regulation of multicolor. Wherein the electrochromic layer mainly comprises the metal reflective layer and the dielectric layer, and the dielectric layer is fabricated by the electrochromic material. The electrochromic layer can obtain various structural colors by regulating the material of the metal layer, the material of the dielectric layer, the thickness of the dielectric layer, etc. Furthermore, the electrochromic layer is utilized as the working electrode, and voltage is applied to the working electrode such that ions in the electrolyte layer are implanted into or released from the electrochromic material, thereby causing changes of the refractive index of the electrochromic material and optical parameters of the dielectric layer, and finally causing color change. The multicolor electrochromic structure in the embodiment of the present invention can achieve various color changes of the electrochromic material, especially an inorganic electrochromic material, by utilizing combination of the structural color and the electrochromism. Additionally, in the multicolor electrochromic structure provided by the embodiment of the present invention, the metal reflective layer can further be utilized as the current collector of the electrochromic layer so as to further simplify the multicolor electrochromic structure, reduce the costs and make the device thinner and more compact.

The following further describes the technical solution of the present invention in detail with reference to several embodiments and the accompanying drawings. However, the preferred embodiments merely are for illustrative purposes and do not limit the scope of the present invention.

Embodiment 1

A multicolor electrochromic device disclosed in Embodiment 1 comprises a working electrode, an electrolyte layer and an counter electrode. The electrolyte layer is arranged between the working electrode and the counter electrode.

Figure 3:
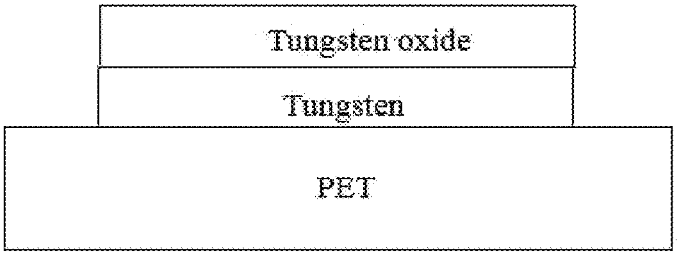
FIG. 3 is a schematic structural diagram of an electrochromic layer in a multicolor electrochromic device in Embodiment 1 of the present invention.

As shown in FIG. 3, the working electrode comprises an electrochromic layer arranged on a substrate, and the electrochromic layer comprises a metal reflective layer and a dielectric layer, wherein the metal reflective layer is fabricated by tungsten and the dielectric layer is fabricated by tungsten oxide. The substrate may be a PET plastic plate.

A fabrication method of the working electrode comprises: first, fabricating a tungsten film on a clean PET plastic plate in a manner of magnetron sputtering, wherein a thickness of the tungsten film is preferably 300 nm; second, fabricating a tungsten oxide layer on the tungsten film in a manner of magnetron sputtering, wherein a thickness of the tungsten oxide layer is preferably in the range of 150-400 nm.

Certainly, the tungsten film can also be fabricated in a manner of electron beam evaporation, thermal evaporation and the like as known in the art. The tungsten oxide layer can also be fabricated in a manner of electron beam evaporation, thermal evaporation, electrochemical deposition and the like as known in the art.

Figure 4:
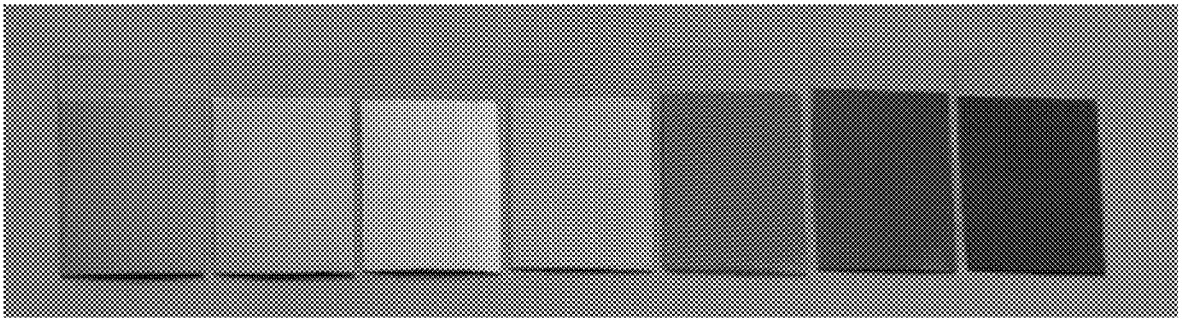
FIG. 4 shows pictures of an electrochromic electrode in a multicolor electrochromic device when the thickness of a tungsten oxide layer is different in Embodiment 1 of the present invention.

As shown in FIG. 4, different colors of the electrochromic layers can be obtained like a color film according to different thicknesses of the tungsten oxide layers.

The fabricated color film is utilized as the electrochromic layer. An layer is fabricated additionally, such as an NiO counter electrode layer. After a $LiClO_4$-PC electrolyte is encapsulated between the working electrode and the counter electrode, a wire is arranged. Therefore, a multicolor electrochromic device fabricated. The color of the obtained multicolor electrochromic device can be further regulated by applying voltages.

Figure 5:
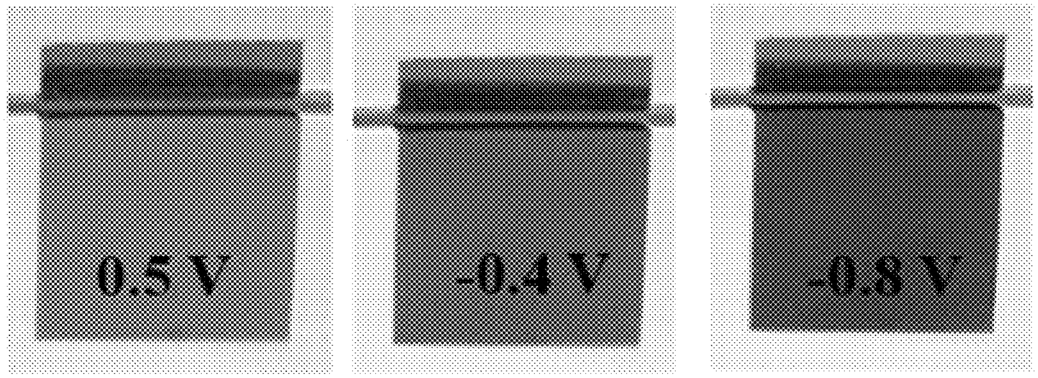
FIG. 5 shows pictures of a working electrode having the original color of pink under different voltages in Embodiment 1 of the present invention.
Figure 6:
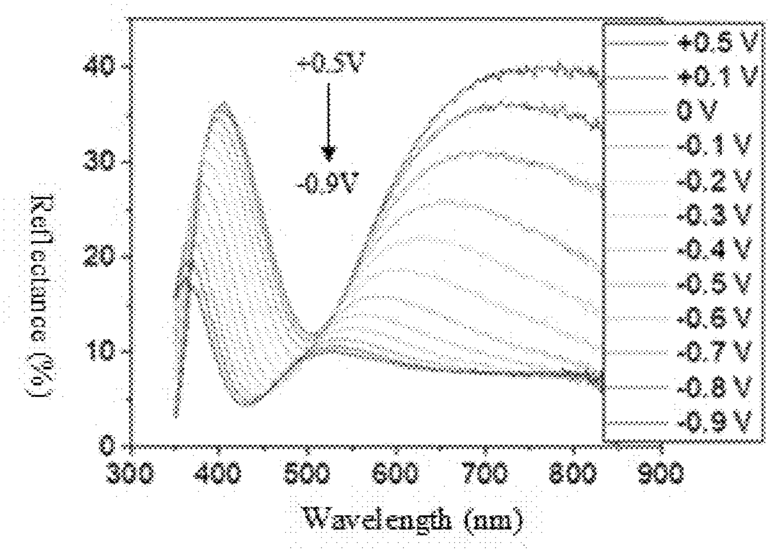
FIG. 6 is a cycling stability test diagram of a working electrode having the original color of pink in Embodiment 1 of the present invention.

FIG. 5 and FIG. 6 respectively show a diagram of regulation of the reflectance of a working electrode, the original color of which is pink, under different voltages of an open system, and pictures of the colors of the working electrodes under three of the voltages in Embodiment 1. The open system selects a Pt filament as the counter electrode and Ag/AgCl as a reference electrode in test. It can be seen that the color of the film can be regulated from red to yellow and then from the yellow to green.

Figure 7:
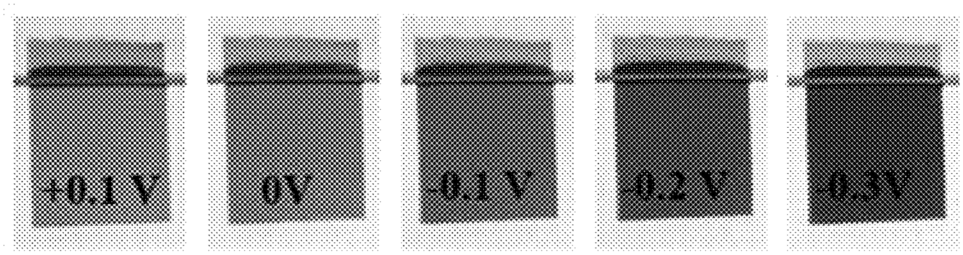
FIG. 7 shows pictures of a working electrode having the original color of blue under different voltages in Embodiment 1 of the present invention.
Figure 8:
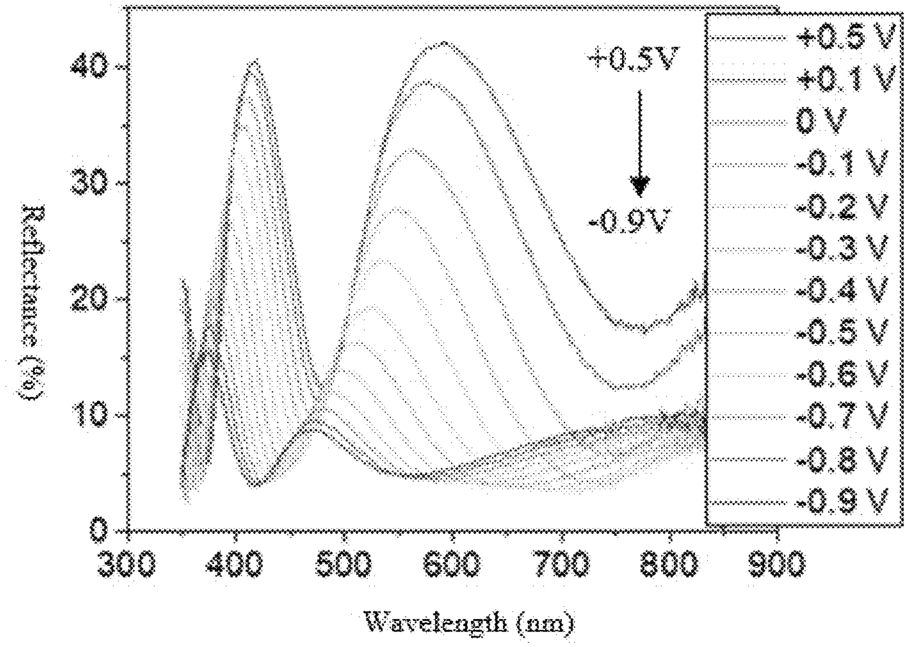
FIG. 8 is a cycling stability test diagram of a working electrode having the original color of blue in Embodiment 1 of the present invention.

FIG. 7 and FIG. 8 respectively show a diagram of regulation of the reflectance of an electrochromic electrode, the original color of which is blue, under different voltages of an open system, and pictures of the colors of the electrochromic electrodes under five of the voltages in Embodiment 1. The open system selects a Pt filament as the counter electrode and Ag/AgCl as a reference electrode in test. It can be seen that the color of the film can be regulated among different blues.

Embodiment 2

A multicolor electrochromic device disclosed in Embodiment 2 comprises a working electrode, an electrolyte layer and an counter electrode. The electrolyte layer is arranged between the working electrode and the counter electrode.

Figure 9:
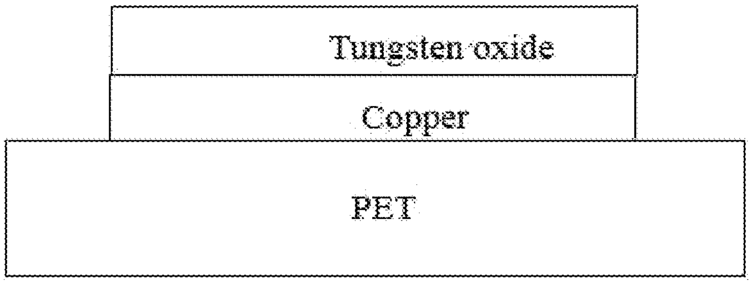
FIG. 9 is a schematic structural diagram of an electrochromic layer in a multicolor electrochromic device in Embodiment 2 of the present invention.

As shown in FIG. 9, the working electrode comprises an electrochromic layer arranged on a substrate, and the electrochromic layer comprises a metal reflective layer and a dielectric layer, wherein the metal reflective layer is fabricated by copper and the dielectric layer is fabricated by tungsten oxide. The substrate may be a PET plastic plate.

A fabrication method of the working electrode comprises: first, fabricating a copper film on a clean PET plastic plate in a manner of magnetron sputtering, wherein a thickness of the copper film is preferably 100 nm; second, fabricating a tungsten oxide layer on the copper film in a manner of magnetron sputtering, wherein a thickness of the tungsten oxide layer is preferably in the range of 150-400 nm.

Certainly, the copper film can also be fabricated in a manner of electron beam evaporation, thermal evaporation and the like as known in the art. The tungsten oxide layer can also be fabricated in a manner of electron beam evaporation, thermal evaporation, electrochemical deposition and the like as known in the art.

Figure 10:
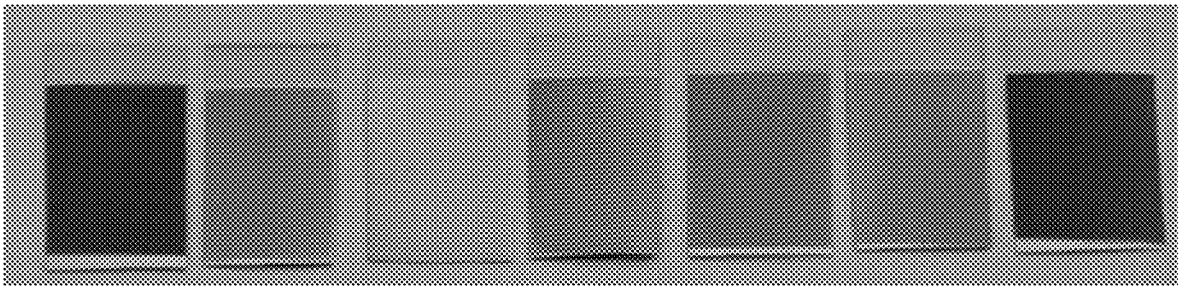
FIG. 10 shows pictures of an electrochromic electrode in a multicolor electrochromic device when the thickness of a tungsten oxide layer is different in Embodiment 2 of the present invention.

As shown in FIG. 10, different colors of the electrochromic layers can be obtained like a color film according to different thicknesses of the tungsten oxide layers.

Embodiment 3

A multicolor electrochromic device disclosed in Embodiment 3 comprises a working electrode, an electrolyte layer and an counter electrode. The electrolyte layer is arranged between the working electrode and the counter electrode.

Figure 11:
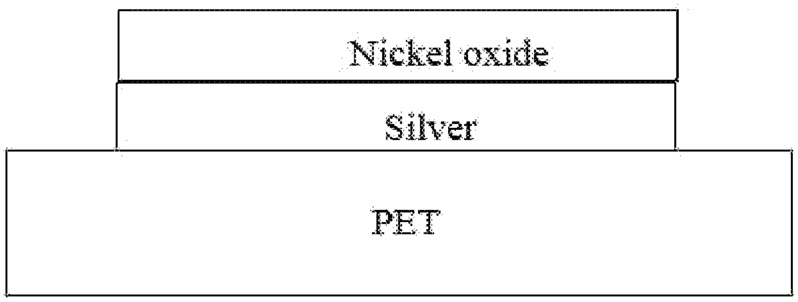
FIG. 11 is a schematic structural diagram of an electrochromic layer in a multicolor electrochromic device in Embodiment 3 of the present invention.

As shown in FIG. 11, the working electrode comprises an electrochromic layer arranged on a substrate, and the electrochromic layer comprises a metal reflective layer and a dielectric layer, wherein the metal reflective layer is fabricated by silver and the dielectric layer is fabricated by nickel oxide. The substrate may be a PET plastic plate.

A fabrication method of the working electrode comprises: first, fabricating a silver film on a clean PET plastic plate in a manner of magnetron sputtering, wherein a thickness of the silver film is preferably 200 nm; second, fabricating a nickel oxide layer on the silver film in a manner of magnetron sputtering, wherein a thickness of the nickel oxide layer is preferably in the range of 50-300 nm.

Certainly, the silver film can also be fabricated in a manner of electron beam evaporation, thermal evaporation and the like as known in the art. The nickel oxide layer can also be fabricated in a manner of electron beam evaporation, thermal evaporation, electrochemical deposition and the like as known in the art.

Figure 12:
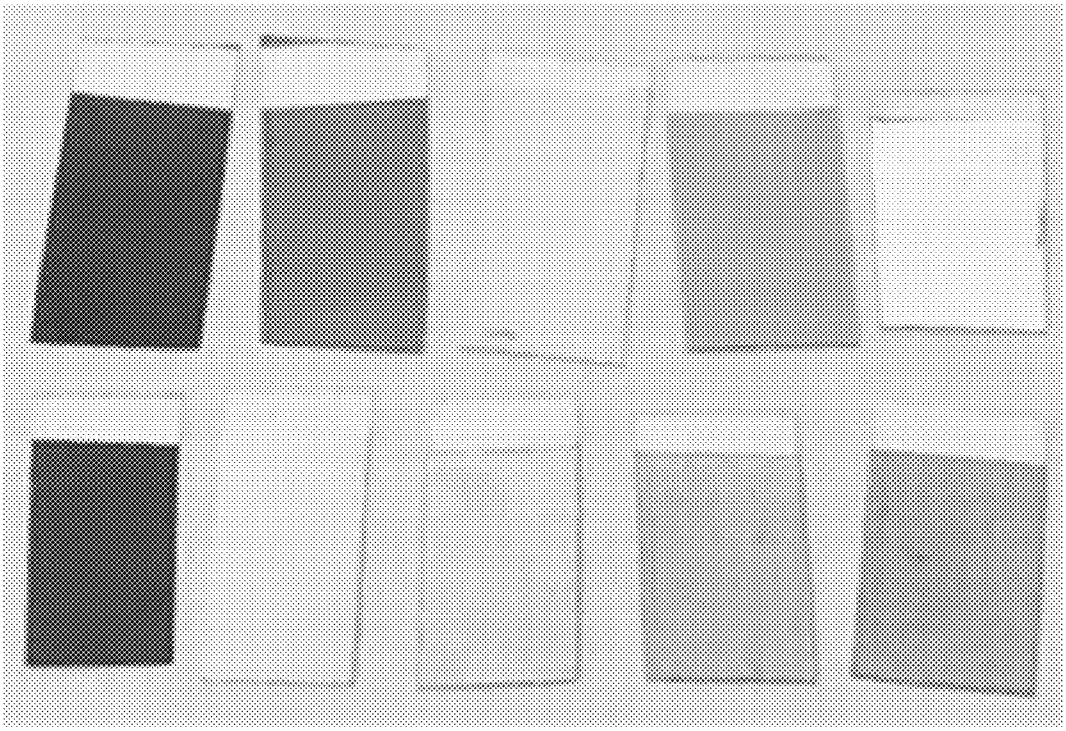
FIG. 12 shows pictures of an electrochromic electrode in a multicolor electrochromic device when the thickness of a nickel oxide layer is different in Embodiment 3 of the present invention.

As shown in FIG. 12, different colors of the electrochromic layers can be obtained like a color film according to different thicknesses of the nickel oxide layers.

Embodiment 4

A multicolor electrochromic device disclosed in Embodiment 4 comprises a working electrode, an electrolyte layer and an counter electrode. The electrolyte layer is arranged between the working electrode and the counter electrode.

Figure 13:
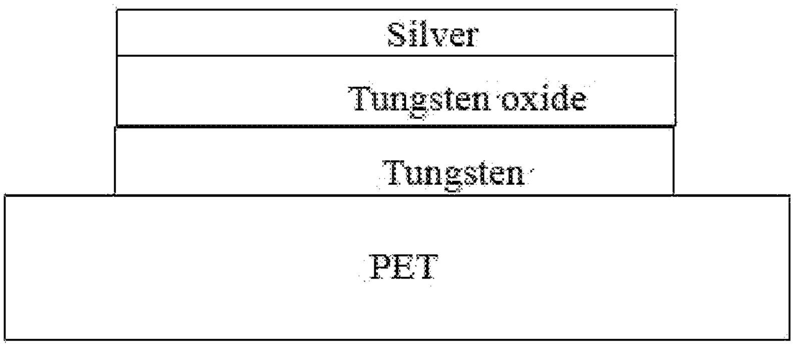
FIG. 13 is a schematic structural diagram of an electrochromic layer in a multicolor electrochromic device in Embodiment 4 of the present invention.

As shown in FIG. 13, the working electrode comprises an electrochromic layer arranged on a substrate, and the electrochromic layer comprises a metal reflective layer, a dielectric layer and an optimized layer, wherein the metal reflective layer is fabricated by tungsten, the dielectric layer is fabricated by tungsten oxide, and the optimized layer is fabricated by silver. The substrate may be a PET plastic plate.

A fabrication method of the working electrode comprises: first, fabricating a tungsten film on a clean PET plastic plate in a manner of magnetron sputtering, wherein a thickness of the tungsten film is preferably 100 nm; second, fabricating a tungsten oxide layer on the tungsten film in a manner of magnetron sputtering, wherein a thickness of the tungsten oxide layer is preferably in the range of 150-400 nm. third, fabricating a silver layer on the tungsten oxide film in a manner of magnetron sputtering, wherein a thickness of the silver layer is preferably in the range of 1-15 nm.

Certainly, the tungsten film can also be fabricated in a manner of electron beam evaporation, thermal evaporation and the like as known in the art. The tungsten oxide layer can also be fabricated in a manner of electron beam evaporation, thermal evaporation, electrochemical deposition and the like as known in the art. The silver layer can be fabricated in a manner of electron beam evaporation, thermal evaporation, electrochemical deposition and the like as known in the art.

Figure 14:
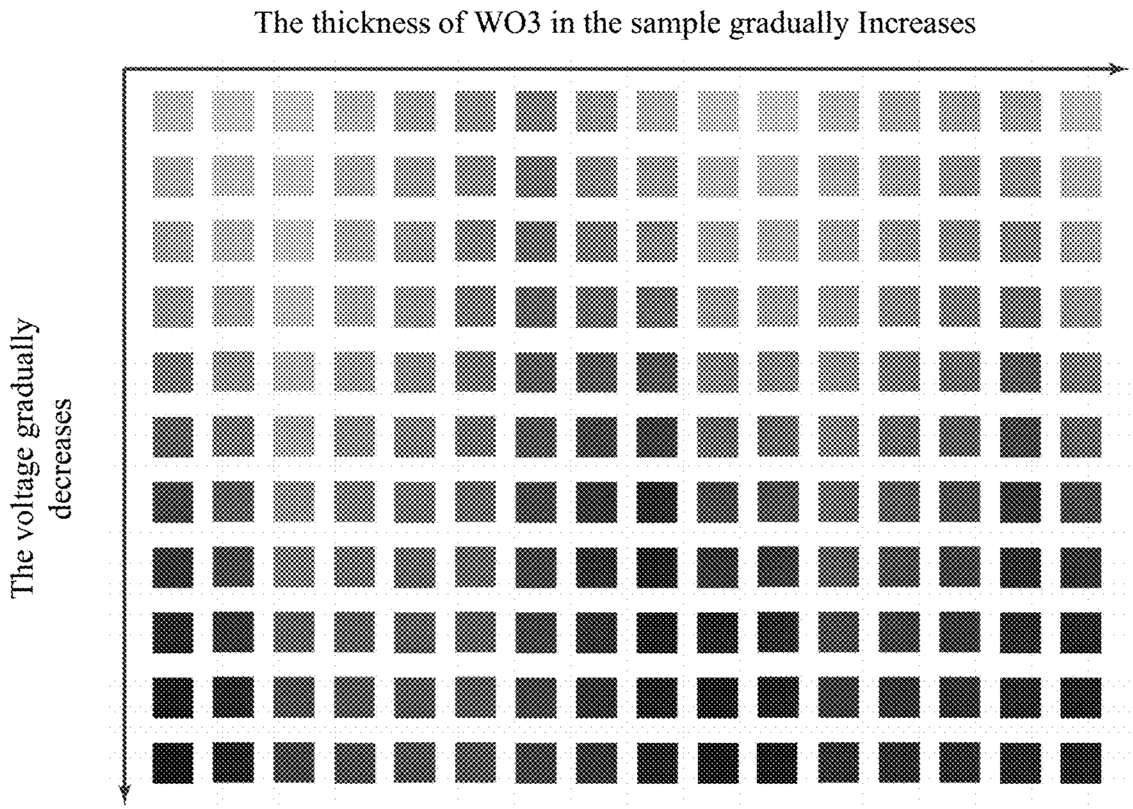
FIG. 14 shows pictures of an electrochromic electrode in a multicolor electrochromic device when the thickness of a tungsten oxide layer is different and a silver optimized layer is arranged in Embodiment 4 of the present invention. Pictures of an electrochromic electrode in a multicolor electrochromic device having different tungsten oxide thicknesses and a silver optimization layer in Embodiment 4 of the present invention under different voltages.

In this embodiment, by controlling different silver layer thicknesses, compared with Embodiment 1, the color of the multicolor electrochromic device can be further optimized. Referring to FIG. 14, it shows the colors of the working electrode under different voltages (−3 V to +3 V) when the multicolor electrochromic device formed by working electrode samples with different tungsten oxide thicknesses (150 nm-250 nm) of the Ag optimization layer (the thickness of Ag is about 5 nm), a counter electrode and an electrolyte is powered on.

Embodiment 5

A multicolor electrochromic device disclosed in this embodiment includes a working electrode and a counter electrode. The working electrode can be composed of a metal reflective layer formed on a PET plastic board and a dielectric layer, wherein the metal reflective layer can be formed by a gold film with a thickness of 100 nm, and the dielectric layer can be formed by polydiyne with a thickness of 50 nm.

A method for preparing the working electrode is as follows: on a clean PET plastic board, a layer of gold film is deposited by a physical vapor deposition method, then polydiyne is deposited on the gold film by using a thermal evaporation method to form a dielectric layer.

When the multicolor electrochromic device is not powered on, the working electrode is red, while when the powering-on voltage is −5 V to +5 V, the color is transformed among red, yellow and green.

Embodiment 6

The structure of the multicolor electrochromic device in this embodiment is basically the same as that in Embodiment 4, but a silver layer as an optimization layer is replaced with a ZnS layer, the thickness can be adjusted in a range of more than 0 and less than or equal to 300 nm, preferably 1-100 nm. When the multicolor electrochromic device is not powered on, it exhibits a single color, while when the multicolor electrochromic device is powered on, its color can be transformed among multiple colors with change in voltage.

Embodiment 7

The multicolor electrochromic device in this embodiment is in a full-solid structure, and also includes a working electrode, an electrolyte and a counter electrode. The structure of this device can refer to FIG. 15. Wherein, the metal reflective layer can select metal W, the dielectric layer can select $WO_3$, the ion conductive layer can select $LiNbO_3$, the ion storage layer selects NiO, and the counter electrode selects ITO. Wherein, the thickness of the metal reflective layer W is 500 nm, the thickness of the dielectric layer $WO_3$ is 163 nm, the thickness of the ion conductive layer $LiNbO_3$ is 600 nm, the thickness of the ion storage layer NiO is 200 nm, and the thickness of the counter electrode ITO is 200 nm. When the inorganic full-solid multicolor electrochromic device in this embodiment is not powered on, it exhibits a single color, while the multicolor electrochromic device is powered on, its color can be transformed among colors with change in voltage.

Embodiment 8

Figure 15:
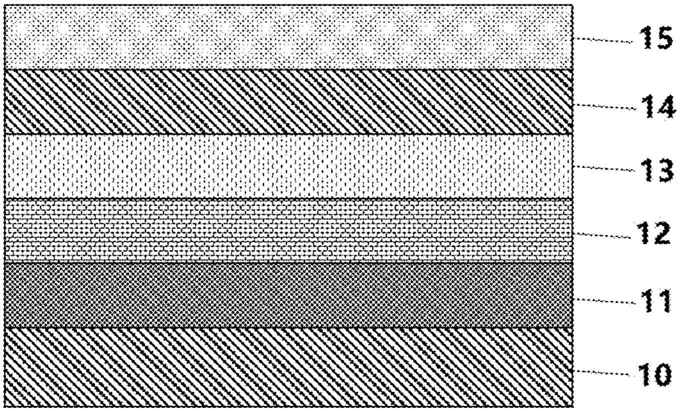
FIG. 15 is a schematic diagram of a multicolor electrochromic structure in another typical embodiment of the present invention.

A structure of an inorganic full-solid multicolor electrochromic device in this embodiment can also refer to FIG. 15, a metal reflective layer selects metal Cr with a thickness of 50 nm, a dielectric layer selects polythiophene with a thickness of 100 nm, an ion conductive layer selects $LiAlF_4$ with a thickness of 400 nm, an ion storage layer selects $Fe_2O_3$ with a thickness of 100 nm, and a counter electrode selects transparent carbon nanotube film with a thickness of 20 nm.

Embodiment 9

A structure of an inorganic full-solid multicolor electrochromic device in this embodiment can also refer to FIG. 15, a metal reflective layer selects metal W with a thickness of 100 nm, an electrochromic layer selects a prussian blue layer with a thickness of 100 nm, an ion conductive layer selects $Li_2O—B_2O_3$ with a thickness of 100 nm, an ion storage layer selects $TiO_2$ with a thickness of 100 nm, and a conductive layer selects AZO with a thickness of 80 nm.

Embodiment 10

A structure of an inorganic full-solid multicolor electrochromic device in this embodiment can also refer to FIG. 15, a metal reflective layer selects metal W with a thickness of 100 nm, an electrochromic layer selects tungsten trioxide with a thickness of 200 nm, an electrolyte selects a mixed ion electrolyte of LiCl and $ZnCl_2$, an ion storage layer selects $TiO_2$ with a thickness of 100 nm, and a conductive layer selects ITO with a thickness of 200 nm. The electrolyte in this embodiment uses a mixture of two ions, which can allow the color of the electrochromic device to become richer and have higher color saturation compared with a situation that a single ion is used.

Furthermore, the applicant of the present invention also conducts experiments by using other electrochromic materials, metal reflective materials, substrate materials and the like listed in the specification to replace the relative materials in the embodiments, then finds out that the obtain multicolor electrochromic structures and devices still have similar advantages.

The multicolor electrochromic structure provided by the embodiments of the present invention can combine the structural color with the electrochromism to display various color changes so as to lay a stable foundation for application of the multicolor electrochromism and have a wide prospect.

It should be understood that the above embodiments merely illustrate technical conceptions and features of the present invention, which aims at enabling persons familiar with this technology to understand and implement the content of the present invention, but not intend to limit the protection scope of the present invention. Equivalent changes or modifications made according to the spiritual substance of the present invention should fall within the protection scope of the present invention.

What is claimed is:

1. A multicolor electrochromic structure, comprising a working electrode, an electrolyte and a counter electrode, the electrolyte being distributed between the working electrode and the counter electrode, and the working electrode comprising an electrochromic layer; wherein, the electrochromic layer comprises a first reflective surface and a second reflective surface which are arranged face to face in parallel; a single dielectric layer is arranged between the first reflective surface and the second reflective surface; the dielectric layer consists of only electrochromic material; the dielectric layer is arranged on a metal reflective layer, the first reflective surface is a first surface of the dielectric layer, the second reflective surface is a bonding interface between a second surface of the dielectric layer and the metal reflective layer, and the first surface is opposite to the second surface;

the first reflective surface, the second reflective surface and the dielectric layer form a single optical cavity; and when incident light falls in the optical cavity, a phase shift of a reflected light formed on the first reflective surface and a reflected light formed on the second reflective surface is $$\tilde{\beta} = (2\pi/\lambda)\tilde{n}_1 d\cos\tilde{\theta}_1;$$

wherein, d is a thickness of the dielectric layer; $\tilde{n}_1$ is a refractive index of the dielectric layer; $\lambda$ is a wavelength of the incident light; $\tilde{\theta}_1$ is an angle of refraction when the incident light passes through the first reflective surface.

2. The multicolor electrochromic structure according to claim 1, wherein a reflection coefficient of the first reflective surface is:

$$\tilde{r}_{01} = (\tilde{n}_0\cos\tilde{\theta}_0 - \tilde{n}_1\cos\tilde{\theta}_1)/(\tilde{n}_0\cos\tilde{\theta}_0 + \tilde{n}_1\cos\tilde{\theta}_1)$$

a reflection coefficient of the second reflective surface is:

$$\tilde{r}_{12} = (\tilde{n}_1\cos\tilde{\theta}_1 - \tilde{n}_2\cos\tilde{\theta}_2)/(\tilde{n}_1\cos\tilde{\theta}_1 + \tilde{n}_2\cos\tilde{\theta}_2)$$

wherein, $\tilde{\theta}_0$ is an angle of incidence of the incident light, $\tilde{\theta}_2$ is an angle of refraction of the incident light when passing through the second reflecting surface, $\tilde{n}_0$ is a refractive index of the dielectric material on the first surface of the dielectric layer, and $\tilde{n}_2$ is a refractive index of the dielectric material on the first surface of the dielectric layer.

3. The multicolor electrochromic structure according to claim 1, wherein a reflection coefficient of the electrochromic layer is:

$$\tilde{r} = \frac{\tilde{r}_{01} + \tilde{r}_{12}e^{2i\tilde{\beta}}}{1 + \tilde{r}_{01}\tilde{r}_{12}e^{2i\tilde{\beta}}}$$

a reflectance of the electrochromic layer is:

$$R = |\tilde{r}|^2 = \frac{\tilde{r}_{01}^2 + \tilde{r}_{12}^2 + 2\tilde{r}_{01}\tilde{r}_{12}\cos 2\tilde{\beta}}{1 + \tilde{r}_{01}^2\tilde{r}_{12}^2 + 2\tilde{r}_{01}\tilde{r}_{12}\cos 2\tilde{\beta}},$$

and, $(R_{max}-R_{min})\geq 10\%$, wherein $R_{max}$ is a maximum value of the reflectivity of the electrochromic layer on the visible light with a wavelength length of 430 nm-780 nm, and $R_{min}$ is a minimum value of the reflectivity of the electrochromic layer on the visible light with a wavelength length of 430 nm-780 nm.

4. The multicolor electrochromic structure according to claim 1, wherein the thickness of the dielectric layer is 50-2000 nm.

5. The multicolor electrochromic structure according to claim 1, wherein a thickness of the metal reflective layer is above 20 nm.

6. The multicolor electrochromic structure according to claim 5, wherein the thickness of the metal reflective layer is 50-3000 nm.

7. The multicolor electrochromic structure according to claim 1, wherein the electrochromic material comprises oxides of Co, Rh, Ir, Ni, Cr, Mn, Fe, Ti, V, Nb, Ta, Mo or W.

8. The multicolor electrochromic structure according to claim 1, wherein the electrochromic material comprises any one or a combination of more of prussian blue or derivatives thereof and heteropolyacids.

9. The multicolor electrochromic structure according to claim 1, wherein the electrochromic material is selected from any one or a combination of more of an organic small molecule, an organic polymer and a metal organic compound, the organic small molecule comprises methyl violet or viologen, the organic polymer comprises any one or a combination of more of polydiyne, polyaniline, polythiophene and polypyrrole, and the organometallic compound comprises an organometallic chelate.

10. The multicolor electrochromic structure according to claim 1, wherein the metal reflective layer comprises one or more transition metals and/or post-transition metals.

11. The multicolor electrochromic structure according to claim 10, wherein the transition metal and/or post-transition metal comprises any one of gold, silver, cobalt, copper, nickel, palladium, platinum, tin, titanium, tungsten and chromium, or alloys thereof.

12. The multicolor electrochromic structure according to claim 1, wherein a thin metal layer can be further added to the dielectric layer to optimize the color of a multicolor film; the thin metal layer comprises one or more transition metals and/or post-transition metals.

13. The multicolor electrochromic structure according to claim 12, wherein the transition metal and/or post-transition metal comprises any one of gold, silver, cobalt, copper, nickel, palladium, platinum, tin, titanium, tungsten and chromium, or alloys thereof.

14. The multicolor electrochromic structure according to claim 1, wherein the working electrode also comprises a substrate, the electrochromic layer is arranged on the substrate, and the material of the substrate comprises glass, organic glass, a plastic board, a wooden board or metal.

15. The multicolor electrochromic structure according to claim 1, wherein the electrolyte comprises a liquid electrolyte, a gel electrolyte or a solid electrolyte.

16. The multicolor electrochromic structure according to claim 15, wherein the electrolyte uses the solid electrolyte.

17. The multicolor electrochromic structure according to claim 16, wherein the multicolor electrochromic structure is in a full-solid structure.

18. The multicolor electrochromic structure according to claim 1, wherein the counter electrode comprises a transparent conductive electrode.

19. The multicolor electrochromic structure according to claim 18, wherein the transparent conductive electrode has an ion storage layer, and the ion storage layer is in contact with the electrolyte.

20. The multicolor electrochromic structure according to claim 1, wherein the metal reflective layer is also used as a current collector of the electrochromic layer.

* * * * *